Feb. 14, 1961 L. D. WANN 2,972,052
RADIOACTIVE LOGGING APPARATUS
Filed Dec. 6, 1955 4 Sheets-Sheet 1

INVENTOR.
LAYMOND D. WANN
BY
Floyd Trimble
ATTORNEY

Feb. 14, 1961    L. D. WANN    2,972,052
RADIOACTIVE LOGGING APPARATUS
Filed Dec. 6, 1955    4 Sheets-Sheet 2

INVENTOR.
LAYMOND D. WANN
BY
*Floyd Trimble*
ATTORNEY

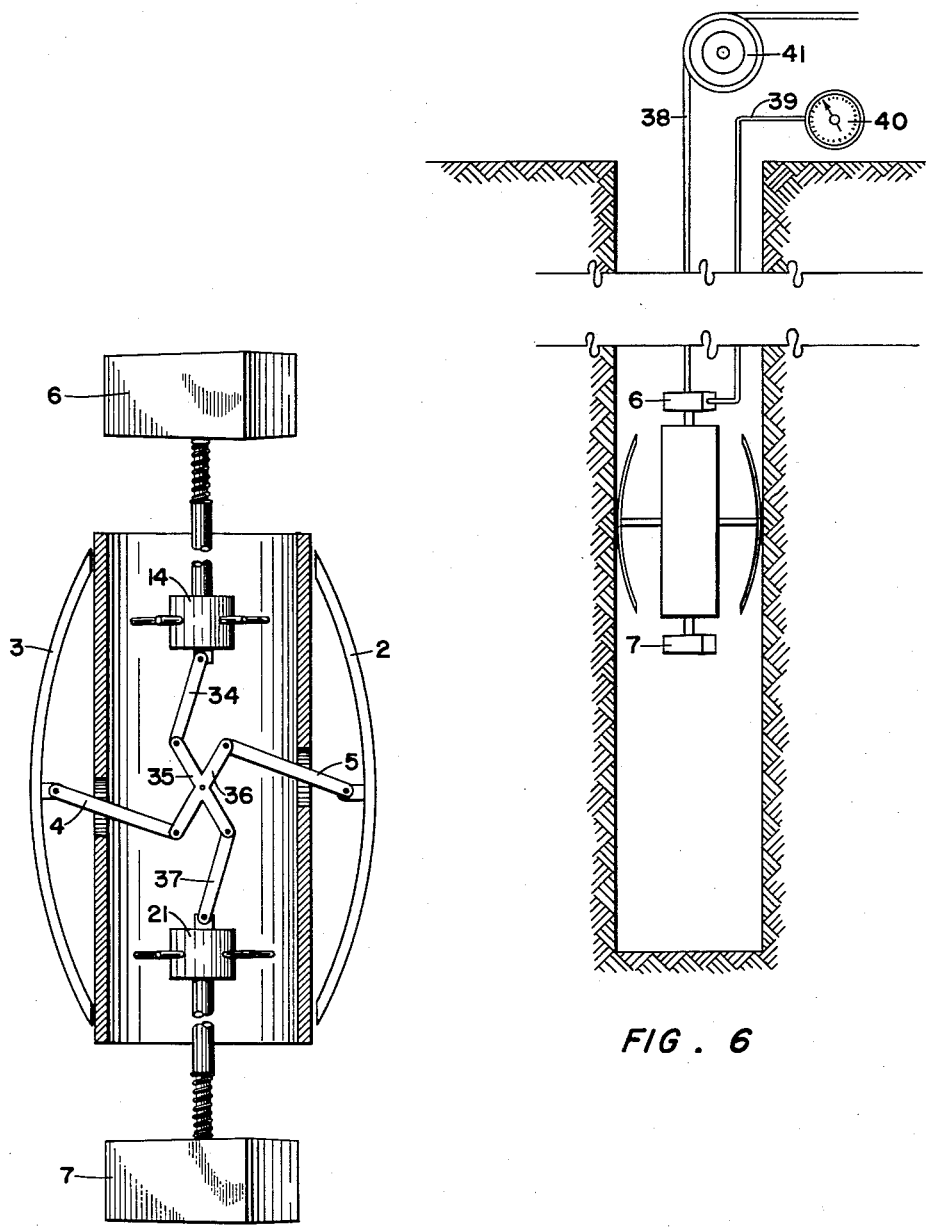

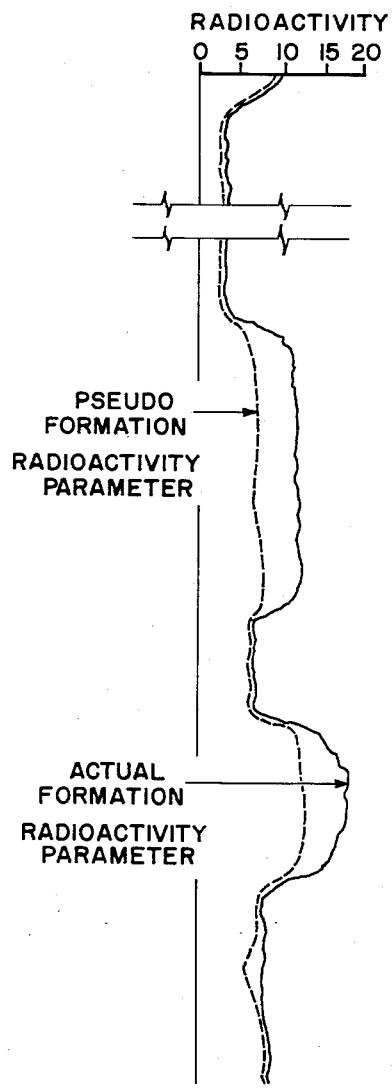
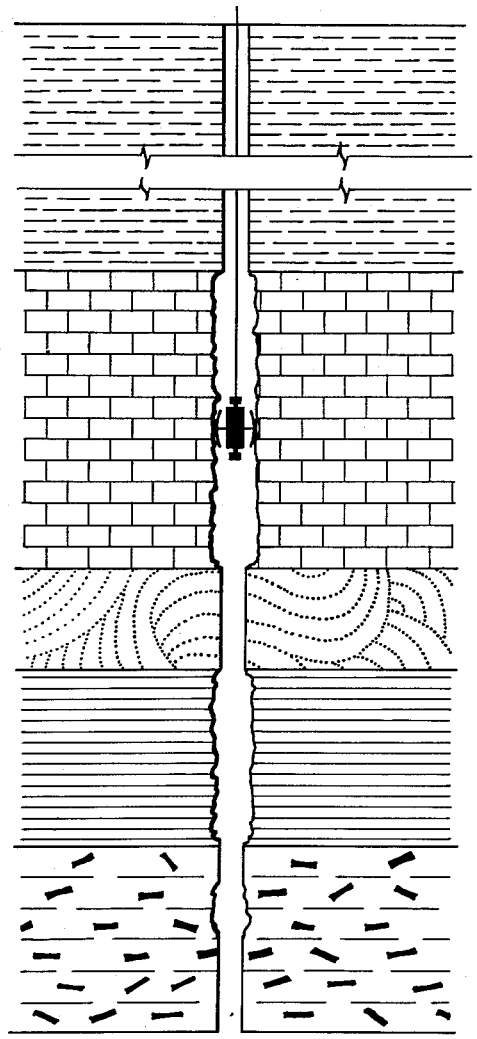
FIG. 8
FIG. 7
INVENTOR.
LAYMOND D. WANN
BY
Floyd Trimble
ATTORNEY

United States Patent Office 2,972,052
Patented Feb. 14, 1961

2,972,052

RADIOACTIVE LOGGING APPARATUS

Laymond D. Wann, Ponca City, Okla., assignor to Continental Oil Company, Ponca City, Okla., a corporation of Delaware Filed Dec. 6, 1955, Ser. No. 551,250

6 Claims. (Cl. 250—83.1)

This invention relates to the art of well logging and more particularly deals with an apparatus suitable for well logging by which the radioactive source-detector spacing of a radioactive logging sonde may be varied as the diameter of the bore-hole varies with the depth during the logging run. Still more particularly, it pertains to an apparatus wherein the ratio of radioactive source-detector spacing to the hole diameter remains constant. This invention is a continuation-in-part of my co-pending application, Serial No. 464,478, entitled "Electrical Logging Apparatus," filed October 25, 1954, now U.S. Patent No. 2,742,606, issued April 17, 1956.

The various methods of radioactive well logging, for example, gamma ray and fast and slow neutron logging, are well known, and their place has been established in the oil industry. It has been found that the accuracy of these logs is affected by the character of the fluid within the well bore-hole as well as the variation in the volume of the fluid as indicated by the variations in the diameter of the well bore. In other words, the accuracy of these logs is dependent in part upon the character of the fluid within the well bore and variations in the volume of the fluid, resulting from variations in the diameter of the well bore. If it is assumed that the hole diameter remains constant, errors are often present in the interpretation of the radioactive logs. It is, therefore, often necessary to run a section gauge log as a correction to the log. This is not satisfactory because, when a logging instrument or anything else is lowered into a deep well, there is an appreciable stretch of the cable. In deep wells, for instance, it has been found that this stretch of the cable amounts to between 5 and 25 feet, depending upon a number of variables, such as weight of the logging instrument, the nature of the cable, the fluid velocity and density, etc. Hence, identical positions of two logging instruments lowered individually into a well are difficult to attain. Although the measuring device might indicate an apparent equal depth, the variations in actual level frequently differ as much as 10 or 15 feet, making it impossible to correlate accurately the readings from the strata. The result is that many narrow-vein oil deposits have been overlooked by failure to correlate logs of fluid characteristics and the diameter of the well bores at the point of measurement.

The principal object of this invention is to provide an apparatus by which the spacing of a radioactive source and detector of a logging sonde will be varied automatically with variations in the diameter of the well bore. It is another object of my invention to provide an apparatus which eliminates the necessity of a section gauge log correlation to logs and facilitates the interpretation of the logs. It is another object of this invention to provide an apparatus wherein the radioactive source and the radioactive detector spacing to hole diameter ratio remains constant. Other objects and advantages reside in certain novel features of the arrangement, as will be apparent from the following description taken in connection with the accompanying drawings in which:

Figure 3:
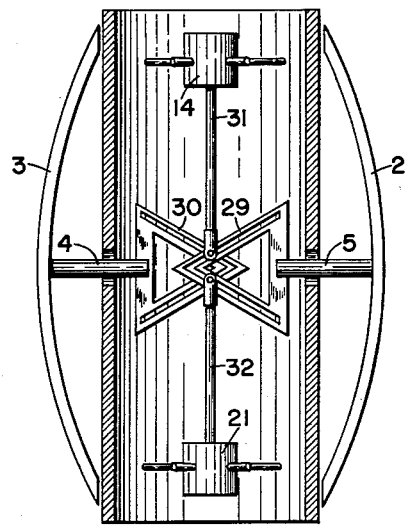
Figure 4:
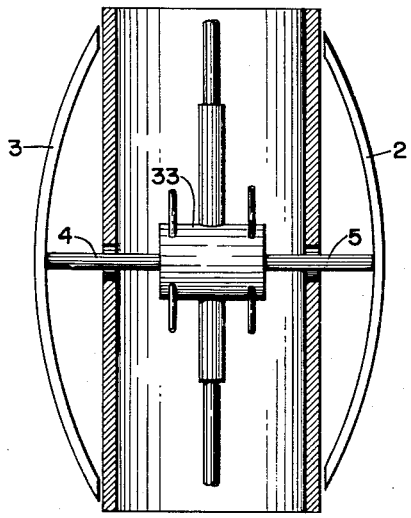

Figures 3, 4, and 5 are side views of other forms of the well logging device.

Figure 6 shows schematically an arrangement of the apparatus according to my invention, and a diagram of an electrical circuit incorporated in the features of the present invention.

Figure 7 is a schematic diagram showing the device in a well bore.

Figure 8 is a plot of a radioactivity parameter determination versus depth of the well.

Figures 1, 2:
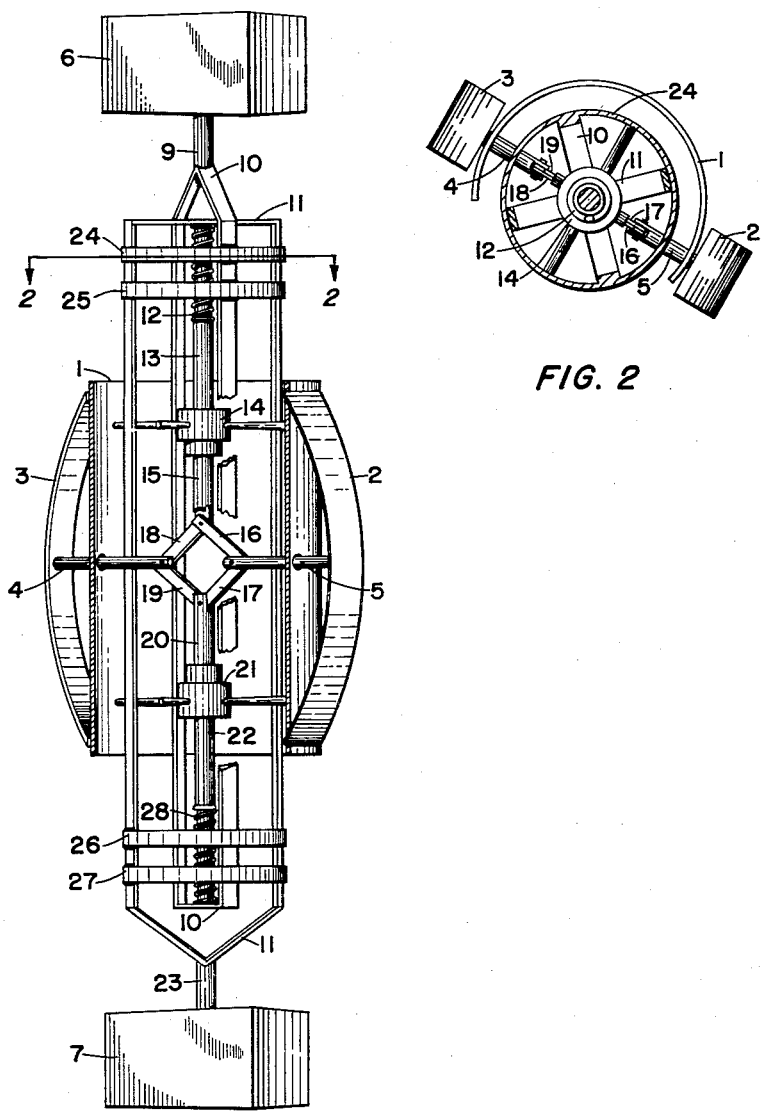
Figure 1 is a side view, partly in section of one form of the well logging device.
Figure 2 is a section taken along the line 2—2 in Figure 1.

Referring to Figure 1, No. 1 denotes the frame of the sonde which is cylindrical, and Nos. 2 and 3 are flexible guides which prevent the bore face from obstructing the passage of the instrument. As the apparatus moves down the bore hole, guides 2 and 3 contact the surface of the bore hole. If the diameter of the bore hole decreases, contact surfaces 2 and 3 move inward, and this movement is translated through rods 4 and 5 to the brackets 16, 17, 18, and 19, causing a corresponding movement in the hydraulic pistons 15 and 20. If the movement is as outlined, pistons 15 and 20 move toward hydraulic cylinders 14 and 21, respectively. This causes a corresponding outward movement of the pistons 13 and 22. Frame 11 moves in the same direction as piston 13, and frame 10 moves in the same direction as piston 22. This causes the movable radioactive source and detector to be drawn closer together. If the contact surfaces 2 and 3 move outward because of a larger diameter bore hole, the radioactive source and detector move farther apart. The compression springs 12 and 28 return the spacing to the larger value as the hole diameter increases. Bands 24 and 25 are attached to frame 11, and bands 26 and 27 are attached to frame 10. The hydraulic cylinders 14 and 21 are attached to frame 1 of the sonde. Radioactive source 7 is attached to frame 11 by means of shaft 10. Likewise, the radioactive detector 6 is attached to frame 10 by shaft 9.

Figures 3, 4 and 5 indicate alternate methods of accomplishing the 90-degree motion transfer. Wedge type levers 29 and 30 are illustrated in Figure 3, which may be used to change the direction of the movement of the wall contacting surfaces by 90 degrees. Another method which may be used is the hydraulic cylinder 33, as illustrated in Figure 4. The latter is particularly useful where the size of the hydraulic cylinder does not exceed practical limits imposed by the hole diameter. Figure 5 exhibits a simplified design using levers 34, 35, 36, and 37 for changing the direction of movement. This type should be most feasible with short-space devices where the ratio of the source detector spacing to the hole diameter is small.

Although mechanical means such as gears and levers could, theoretically, be used to translate the movement of the bore hole contacting surfaces 2 and 3 to the movable radioactive source 7 and the radioactive detector 6, there are a number of disadvantages to such a method. In the first place, the ratio of the movement of the contact surfaces to the source and detector surfaces must be a straight-line function. This would necessitate a rather complicated set of gears and levers. As the instrument passes down the bore hole, it comes in contact with the well fluids and mud. Obviously, such materials in the gears would be detrimental, causing them to react unnaturally or not act at all. An attempt to seal off the gears so that such materials could not come in contact with the gears would be rather impractical because of the high pressures existing in the well. Near the bottom of the well, the pressure on the radioactive elements would be so great that the compression of the spring would be of no consequence. I therefore propose to employ hydraulic means or hydraulic means plus a very simple lever to translate the movement of the contacting surfaces to the movable elements.

Referring to Figure 6, the logging device adapted to be lowered into a well bore containing fluids can be supported by insulated cable 38. The cable 38 can be wound onto a reel 41 at the surface, in a manner well known in this art. Thus, the cable 38 passes over a measuring sheave on the reel as the logging device is moved through the well.

Figure 8 is a plot of a radioactivity parameter determination versus depth of the well illustrated in Figure 7. The solid line denotes those values obtained, using the sonde of my invention, and the broken line denotes those values calculated from a conventional log, wherein the false assumption was made that the spacing-hole diameter ratio remains constant. These data were obtained using a radium-beryllium mixture as the neutron source, a scintillation counter as the gamma-ray detector, and recording potentiometer at the surface. There are two particular advantages resulting from the use of my sonde as compared to prior art. First, the determinations made by my invention are more quickly obtained because there is no need for running a section gauge log as a correction to the log, with a subsequent plotting of the results. Second, greater accuracy is obtained, using my sonde. In substance, my sonde is provided with a caliper device so that diameter variations of the well bore cause a corresponding variation in the spacing of the radiation elements. When the hydrogen ion content of the well fluid is constant, this source-detector movement and consequent variation of the fluid's neutron absorption are proportional to well bore variation. The use of such a cell in these conditions, therefore, applies to the radioactivity measuring circuit, a corrective feature which offsets the effect on a primary radioactive log of a well bore diameter variation to afford a corrected or modified log more accurately representing the true, induced, radioactivity of the medium being investigated.

The particular radioactive or neutron source used is not critical, as it may be one which emits either fast or slow neutrons. Examples of suitable neutron sources are the products resulting from the action of a radioactive element on one of the following: aluminum, beryllium, boron, lithium, magnesium, phosphorous, and sodium. A preferred radioactive source is a mixture of radium-beryllium, polonium-beryllium, or a positive ion neutron generator. Since all of these neutron sources are familiar to those skilled in the art, they will not be described further.

When a mixture of either liquids or solids is bombarded by neutrons, the different components of the mixture may affect the neutrons differently. As, for example, some substances will scatter neutrons while other substances will absorb neutrons through inelastic collisions and neutron capture reactions. If the neutrons are scattered they will rebound at various angles, and as a result a few will strike the radiation detector. When the neutrons are absorbed by the formation nuclei, large quantities of gamma radiation will be produced, a portion of which will strike the radiation detector. The gamma-ray intensity attributable to neutron absorption will, in practice, be large compared to the gamma-ray background and gamma radiation formed from other processes. As a result, gamma-ray intensity readings will be almost entirely attributable to neutron absorption. Since we may have either neutron scattering or neutron absorption, the particular detector used should be one that will detect neutrons or gamma rays, and preferably for greater accuracy, it should detect those two only.

The particular detector used should be one that will detect neutrons or gamma rays only; otherwise there is no criticality. Suitable detectors include boron-coated proportional counters, B–10 enriched boron-trifluoride counters, scintillation counters, Geiger counters, and scintillation spectrometers. Since these detectors are also familiar to those skilled in the art, they will not be described further. The detector is connected by means of the cable 38 to a suitable device 40 such as an electronic scaler or a recording potentiometer which records the detected signal at the surface.

For best results, the neutron detector should be shielded from direct radiations from the neutron source. This is accomplished by means of a shield of metal foil inserted between the detector and source.

In the foregoing detailed description, it will be apparent that many variations may be made without departing from the spirit and scope of the invention. Thus, for example, the sonde may be constructed wherein both the radiation source and detector are movable, as described above, or either one may be stationary and the other movable. Many other variations will be apparent to those skilled in the art. I, therefore, intend to be limited only by the scope of the appended claims.

I claim:

1. A radioactive logging device adapted to pass within a well bore containing well fluids, said device comprising a cylindrical frame, a movable neutron source consisting of a mixture of radium and beryllium, and a movable radioactive detector, said neutron source and said radioactive detector mounted longitudinally in respect to said frame and at opposite ends of said frame, elastic means forcing said neutron source and detector away from each other, wall contacting means for following the contour of the bore hole, connecting means between said contacting means and said movable neutron source and said detector whereby a horizontal movement of said contacting means causes a vertical movement of said movable neutron source and detector so that the ratio spacing between said movable neutron source and detector to the bore hole diameter remains constant.

2. A radioactive logging device adapted to pass within a well bore containing well fluids, said device comprising a cylindrical frame, a movable neutron source consisting of a mixture of polonium and beryllium, and a movable radioactive detector, said neutron source and said radioactive detector mounted longitudinally in respect to said frame and at opposite ends of said frame, elastic means forcing said neutron source and detector away from each other, wall contacting means for following the contour of the bore hole, connecting means between said contacting means and said movable neutron source and said detector whereby a horizontal movement of said contacting means causes a vertical movement of said movable neutron source and detector so that the ratio spacing between said movable neutron source and detector to the bore hole diameter remains constant.

3. A radioactive logging device adapted to pass within a well bore containing well fluids, said device comprising a cylindrical frame, a positive ion neutron generator as a movable neutron source, and a movable radioactive detector, said neutron source and said radioactive detector mounted longitudinally in respect to said frame and at opposite ends of said frame, elastic means forcing said neutron source and detector away from each other, wall contacting means for following the contour of the bore hole, connecting means between said contacting means and said movable neutron source and said detector whereby a horizontal movement of said contacting means causes a vertical movement of said movable neutron source and detector so that the ratio spacing between said movable neutron source and detector to the bore hole diameter remains constant.

4. A radioactive logging device adapted to pass within a well bore containing well fluids, said device comprising a cylindrical frame, a movable neutron source, and a movable radioactive detector consisting of a Geiger counter, said neutron source and said radioactive detector mounted longitudinally in respect to said frame and at opposite ends of said frame, eleastic means forcing said neutron source and detector away from each other, wall contacting means for following the contour of the bore hole, connecting means between said contacting means and said movable neutron source and said detector whereby a horizontal movement of said contacting means causes a vertical movement of said movable neutron source and detector so that the ratio spacing between said movable neutron source and detector to the bore hole diameter remains constant.

5. A radioactive logging device adapted to pass within a well bore containing well fluids, said device comprising a cylindrical frame, a movable neutron source, and a movable radioactive detector consisting of a neutron detector, said neutron source and said radioactive detector mounted longitudinally in respect to said frame and at opposite ends of said frame, elastic means forcing said neutron source and detector away from each other, wall contacting means for following the contour of the bore hole, connecting means between said contacting means and said movable neutron source and said detector whereby a horizontal movement of said contacting means causes a vertical movement of said movable neutron source and detector so that the ratio spacing between said movable neutron source and detector to the bore hole diameter remains constant.

6. A radioactive logging device adapted to pass within a well bore containing well fluids, said device comprising a cylindrical frame, a movable neutron source, and a movable radioactive detector consisting of a gamma ray detector, said neutron source and said radioactive detector mounted longitudinally in respect to said frame and at opposite ends of said frame, elastic means forcing said neutron source and detector away from each other, wall contacting means for following the contour of the bore hole, connecting means between said contacting means and said movable neutron source and said detector whereby a horizontal movement of said contacting means causes a vertical movement of said movable neutron source and detector so that the ratio spacing between said movable neutron source and detector to the bore hole diameter remains constant.

References Cited in the file of this patent
UNITED STATES PATENTS

| | | |
|---|---|---|
| 2,515,500 | Fearon et al. | July 18, 1950 |
| 2,543,675 | Swift | Feb. 27, 1951 |
| 2,648,778 | Silverman et al. | Aug. 11, 1953 |
| 2,725,486 | Walstrom | Nov. 29, 1955 |